(12) United States Patent
De Breed (10) Patent No.: US 6,944,628 B1
(45) Date of Patent: Sep. 13, 2005

(54) METHOD FOR ELECTRONICALLY ADDRESSING OF A PERSON OR ORGANIZATION

(76) Inventor: Anthony Jacques Louis De Breed, Baronielaan 227, ML-4835 JK Breda (NL)

( * ) Notice: Subject to any disclaimer, the term of this patent is extended or adjusted under 35 U.S.C. 154(b) by 366 days.

(21) Appl. No.: 09/720,770

(22) PCT Filed: Jun. 2, 2000

(86) PCT No.: PCT/NL00/00902

§ 371 (c)(1),
(2), (4) Date: Aug. 30, 2001

(87) PCT Pub. No.: WO01/40892

PCT Pub. Date: Jun. 7, 2001

(30) Foreign Application Priority Data

Dec. 6, 1999 (NL) .............................................. 1013759

(51) Int. Cl.[7] ............................................. G06F 17/30
(52) U.S. Cl. .................. 707/104.1; 707/10; 707/103 R; 709/217; 709/205; 709/206
(58) Field of Search ................................ 707/104.1, 10, 707/103 R, 1; 709/217, 218, 206, 205, 207

(56) References Cited

U.S. PATENT DOCUMENTS

| 5,555,426 A | 9/1996 | Johnson et al. | |
| 5,987,508 A | 11/1999 | Agraharam et al. | ........ 709/217 |
| 5,999,967 A | 12/1999 | Sundsted | |
| 6,065,016 A | 5/2000 | Stuntebeck et al. | ........ 707/200 |

FOREIGN PATENT DOCUMENTS

| EP | 0375138 A2 | * | 6/1990 | ........... H04L/12/58 |
| EP | 0 823 809 A2 | | 2/1998 | |
| GB | 2328110 A | * | 2/1999 | ........... H04M/3/50 |
| WO | WO 99/23591 | | 5/1999 | |
| WO | WO 99/33188 A2 | * | 7/1999 | |
| WO | WO 99/40527 | * | 8/1999 | ........... G06F/17/30 |

OTHER PUBLICATIONS

"Finding elusive E–mail addresses using online resources," (Pub. 1993, Medford, NJ, USA, Learned Inf. USA.).
"The Coming Global Directory for E–Mail" Datamation, Nov. 15, 1989, (pp. 105, 106, 108).

* cited by examiner

*Primary Examiner*—Frantz Coby
(74) *Attorney, Agent, or Firm*—Webb Ziesenheim Logsdon Orkin & Hanson, P.C.

(57) ABSTRACT

Disclosed is a method for addressing a person or organization via electronic means, wherein the addresses of people and/or organizations are stored in a database, wherein the addresses from the database are linked to publicly accessible data such as name, telephone numbers, fax number and/or postal codes, and a method for processing and/or sending in electronic manner one or more e-mail messages wherein the addresses of people and/or organisations are stored in a database, and wherein the addresses from the database are linked to publicly accessible data such as name, telephone numbers, fax number and/or postal codes.

27 Claims, 6 Drawing Sheets

METHOD FOR ELECTRONICALLY ADDRESSING OF A PERSON OR ORGANIZATION

BACKGROUND OF THE INVENTION

In the case of both organisations and private individuals electronic message traffic continues to expand considerably. A growing number of private individuals also have one or more e-mail addresses, while a personal web page is also within reach of many private individuals.

If however it is wished to send an e-mail to a random third party, it is difficult at the moment to find out the e-mail address of this person. In contrast to normal addresses, e-mail addresses are not linked in logical and traceable manner to a private individual or organisation.

Known from U.S. Pat. No. 6,065,016 is a directory service which enables a user to obtain communication addresses of individuals from a recent analysed location or database. This is a professional system for internal use or simultaneous use by a number of companies.

SUMMARY OF THE INVENTION

The present invention provides a method for addressing a person or organisation via electronic means, wherein the addresses of people and/or organisations are stored in a database, wherein the addresses from the database are linked to publicly accessible data such as name, telephone numbers, fax number and/or postal codes.

A preferred embodiment of the method for processing and/or sending one or more e-mail messages in electronic manner, wherein the addresses of people and/or organisations are stored in a database, and wherein the addresses from the database are linked to publicly accessible data such as name, telephone numbers, fax number and/or postal codes.

A further preferred embodiment of the method further comprises one or more steps for inputting message data comprising at least one or more items of the publicly accessible data.

In most countries practically all data of private individuals and organisations can be found in an electronic or paper telephone directory. If using an internet site a data set is available or made accessible in which all publicly known data of private individuals and/or organisations is stored, anyone who so wishes can link his e-mail address thereto in a manner which is visible or invisible to the sender of a message. The e-mail address can also comprise the tax number, the mobile telephone number for a telephone with e-mail options, postal address including postal code or the physical address with postal code, and the like. A link can also be made to a web page or web site from which further data can be inferred.

A further preferred embodiment of the method comprises one or more steps for inputting further message data such as advance notice data and/or subject data, content data, parameter data, such as for instance period of validity data and/or areas of interest data. An advantage hereof is that possible recipients of the message do not have to receive the whole message but only the advance notice data which includes among other things the subject data, content data, parameter data such as for instance period of validity data and/or areas of interest data. If the recipient is interested he can then download the whole message. If he concludes on the basis of this information that he has no interest, the message does not have to be downloaded, thus saving data traffic and time. Another advantage hereof is that people who receive messages according to this method can indicate whether they are interested in particular matters and if they wish to receive messages about these or not. People will experience a much lower threshold in participating in addressing on the basis of publicly accessible data if they can indicate in advance which information they do or do not wish to receive. More will be said about this later in this document. This embodiment provides for the indication of parameters in the message to be sent which may be helpful in determining this type of areas of interest. These parameters can further indicate for how long and when the message is valid. The possible recipient can then already see from the advance notice in the message when the validity expires and it must thus be read.

A further embodiment of the method comprises one or more steps for filtering the e-mail messages. The above stated areas of interest are for instance criteria according to which filtering can take place. The type of sender is another criterion for filtering information.

A further refinement of the method provides filtering for the purpose of checking for the presence of viruses in the e-mail messages and optional removal thereof from the e-mail messages. That messages contain viruses is one reason for recipients not to wish to automatically receive unexpected messages from strangers via an addressing system on the basis of publicly accessible data. A functionality is therefore provided to prevent the potential presence of viruses. This has the advantage that potential recipients will be more readily inclined to participate in an addressing system based on publicly accessible data.

Further embodiments of the method comprise steps for checking on transmission permission of the sender and for preventing or delaying spam messages.

These additional steps have the advantage that acceptation of the method by message recipients is increased.

Further embodiments of the method comprise further steps for:
  automatically retrieving an e-mail address in the addressing data,
  sending at least a part of the message to the e-mail address if this is permissible on the basis of the results of the filtering steps. These steps relate to actual addressing of an e-mail message which has been addressed according to the method. The advantage is that messages can be sent using publicly accessible data.

One embodiment comprises steps for assisting in a manual search for an addressee in the database. If a sender wishes to send a message, using these steps he can retrieve data relating to a recipient step by step. An embodiment comprises steps for retrieving the addressee on the basis of a telephone number, a postal address and/or a name.

One embodiment comprises steps for:
  automatically retrieving an e-mail address by searching according to telephone number,
  automatically retrieving for an e-mail address by searching according to address,
  automatically retrieving an e-mail address by searching according to another protocol, such as a social security number, DUNS, Chamber of Commerce number or VAT number. If an e-mail message is sent it is important that the method be able to process this message as quickly as possible. Using these steps a message is automatically redirected to the e-mail address of the recipient on the basis of the publicly accessible data to which it was directed in the first instance.

An embodiment comprises further steps for sending status messages relating to the message to the sender, so that the sender receives information as to whether his message has been read or refused by the recipient.

One embodiment comprises steps for registering users by means of user profiles so that they can be addressed using the method. Exclusion lists can further be added to the user profile whereby the user can determine from whom no messages may be passed on to him. A list of friends/contacts (buddy list) can also be added to the user profile. These additions have the advantage that acceptance of the method is increased among potential users of the method because users have more control over what can be received or refused and because a user himself has more options for addressing desired groups.

An embodiment comprises steps for adding a commercial/private indication to the user profile. This has the advantage that the method can for instance determine what the transmission permission of the sender are.

An embodiment comprises a step of writing to an addressee who is not a registered user of the method. The method also comprises steps for ringing an addressee who is not a registered user of the method. This has the advantage that a recipient can become aware of the fact that a message has been sent to him, even if he is not yet a participant in the system.

In a further embodiment of the method the database forms part of an internet site.

In a further embodiment steps are provided for retrieving messages on the basis of advance notice data, subject data, content data and/or the parameter data such as for instance period of validity data and/or areas of interest data. An advantage of this embodiment is that recipients can retrieve messages which are not addressed to them. A further advantage is that the distribution of the message becomes free of charge, which is advantageous for the sender. The people who are searching within this method specifically for current information on the web site can also search in the messages which are to be found thereon, because period of validity data have for instance been added.

In a further preferred embodiment steps are further provided for securing and/or encoding the message traffic. Steps are further provided for securing and/or encoding matters with high security requirements, such as authentication/identification for the purpose of enabling financial transactions such as payments and/or user options such as for instance electronic voting.

The advantages hereof are that all recipients of messages/users of the web site can be provided with unique secret keys and the option of sending messages/information in encoded manner with keys in a manner such that only an authenticated recipient can read the messages. Because a sender is also identified, confidential applications can, as further advantage, make use of the possibilities of the web site, such as settling financial transactions or electronic voting.

In one embodiment there is provided in a computer or a number of mutually coupled computers, memory space for storing the database and software for performing the method. This enables a highly automated embodiment of the method.

The following may serve as example. If the internet site where all publicly accessible data is known is called "addressdirectory or phonebook", an e-mail, once it has been composed, can be addressed to Mr. Jansen at Baronielaan 186, 4521 BZ Breda, who has for instance the Dutch telephone number 076-56 54 321, as follows; 0031765654321@phonebook.nl or jansen.baronielaan186.breda@addressdirectory.nl (or more briefly 186.45218Z@addressdirectory.nl.

Depending on the possibilities of the internet site "phonebook or addressdirectory" and the wishes of Mr. Jansen; the message will be sent automatically if a link has been made by Mr. Jansen to his publicly accessible data on the internet site "phonebook or address directory."

It is also conceivable for a screen to be displayed to the user which shows that Mr. Jansen has not made an e-mail address known to this site or that there are a number of family members with the name Jansen, with the respective names and/or addresses.

It is further possible to envisage the private web page of Mr. Jansen being displayed to the user, on which can be shown further options for sending an e-mail. The following addressing can be used by way of example: www.0031765654321.phonebook.nl and, if there are a number of occupants, this can be addressed more specifically by adding "jansen" between www.00 and phonebook: www.jansen0031765654321.phonebook.nl.

It will be apparent that the internet site address directory can also be consulted in order to see which Mr. Jansen (in Breda) must be addressed, for instance by looking at the perhaps known physical or postal address of Mr. Jansen, from which his telephone number, postal code, fax number and the like can be derived, which can then be used as address in the above stated sense.

The present invention has further advantages if users wish to approach a large number of people and/or business contacts, as in so-called direct mailing. By for instance selecting on the basis of postal code 4837 or the telephone area code 76, a large number of people in the Breda area can be mailed, with possible further division using postal codes, street or district.

The present invention can perhaps be technically implemented on a computer such as also known from the above stated United States patent.

It is further conceivable that a separate category will become available on internet for the data, such as Jansen1864837be.nl.address or 003176564321.tel or 076565431.nl.

The present invention is not limited to the above stated example; the rights sought are defined by the following claims, within the scope of which many modifications can be envisaged.

BRIEF DESCRIPTION OF THE DRAWINGS

Further advantages, features and details of the present invention will become apparent on reading of the following description of a preferred embodiment with reference to the annexed figures, wherein.

DESCRIPTION OF THE PREFERRED EMBODIMENT

It is an object of the present invention to make it possible to send an e-mail to a person without knowing what his or her e-mail address is, or to find the digital domain and to then send an e-mail. For this purpose (FIG. 1) a sender can go to a web site on which implementation of this method is possible. In this embodiment a message consists of four parts. The first part is the advance notice. The advance notice is that part of the message which, on the basis of the address (see further), is immediately redirected to the recipient. A purpose of this advance notice is that lengthy messages and/or messages to many recipients need only be sent to the addressee if he, on the basis of the advance notice, wishes to read them. The addressee receives an advance notice and determines on the basis of this advance notice whether the rest of the message must be redirected to him. The second part of the message in this embodiment is the message itself, which can optionally be supplemented with other content such as image, sound and the like. If desired, this part of the message is not redirected to the addressee, but only if this latter is interested in it. This message is then stored for instance on a server of the web site with which this method is performed. The third component of the message is the addressing. The e-mail address does not have to be filled in here. It is possible to suffice with generally available data, such as for instance a telephone number or a postal code with house number. A fourth part of the message in this embodiment consists of parameters indicating a period of validity of the message, channels, options for interim changes to the message and the like. Channels are for instance areas of interest of a recipient.

Figure 4:
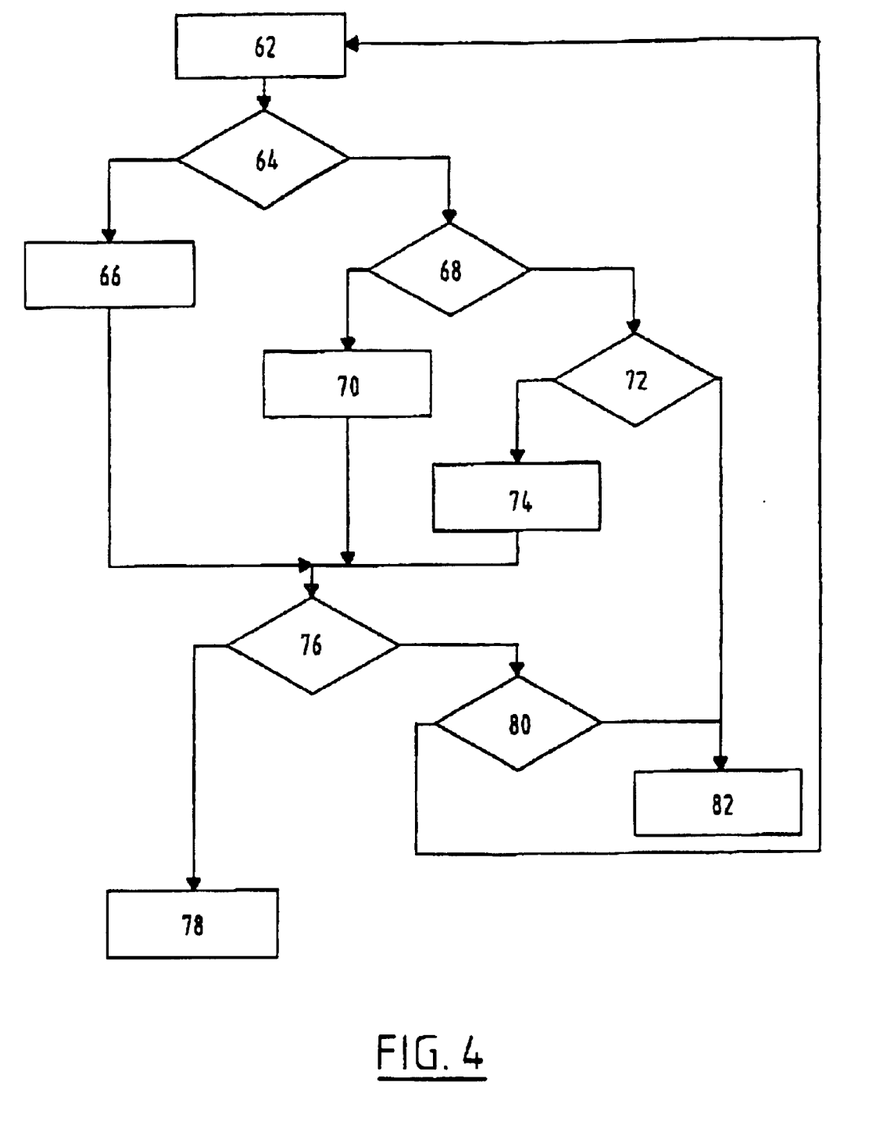
FIG. 4 shows another embodiment of the present invention.

Inputting of the recipients in step 2 can optionally take place using a search assistant as shown in FIG. 4.

Figure 1:
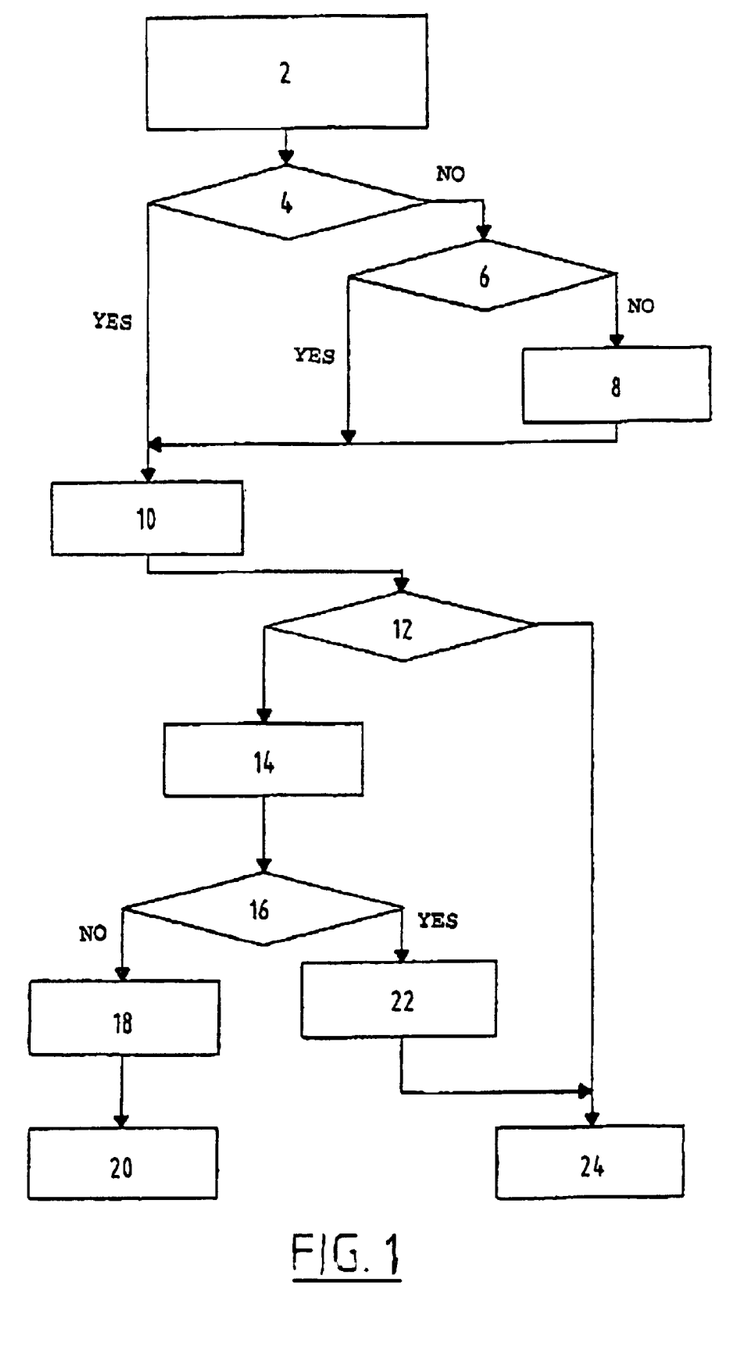
FIG. 1 shows a flow diagram of a part of a method of an embodiment.

A check is made in step 4 whether the message is directed to a recipient or to a group of recipients. In the case the message is addressed to one recipient, the operation is continued in step 10. If the message is addressed to a plurality of recipients, a number of interim steps are first performed in step 6 and step 8.

A check is made in step 6 whether the sender is authorized by the web site to send to a plurality of addressees. If this is so, the message, or in fact the messages, are sent. If this is not the case, a spam delay step comes into operation in 8. This means that a maximum of one e-mail is sent in a predetermined period of time. From the steps 4, 6 and 8 all sent messages arrive in step 10 where a check is made for viruses. If it is determined in 12 that a virus has been found, an attempt is made in 14 to remove the virus. If it is determined in 16 that the virus has been removed, a message is sent to the sender that his message contained a virus and the message is allowed through to step 24. If it is determined in 16 that the virus has not been removed, the message is destroyed in 18. A message is then sent to the sender in 20 that his message could not be sent because of a virus. From 12 and 22 it is possible to arrive in 24, which shows that the message is a sendable message.

Figure 2:
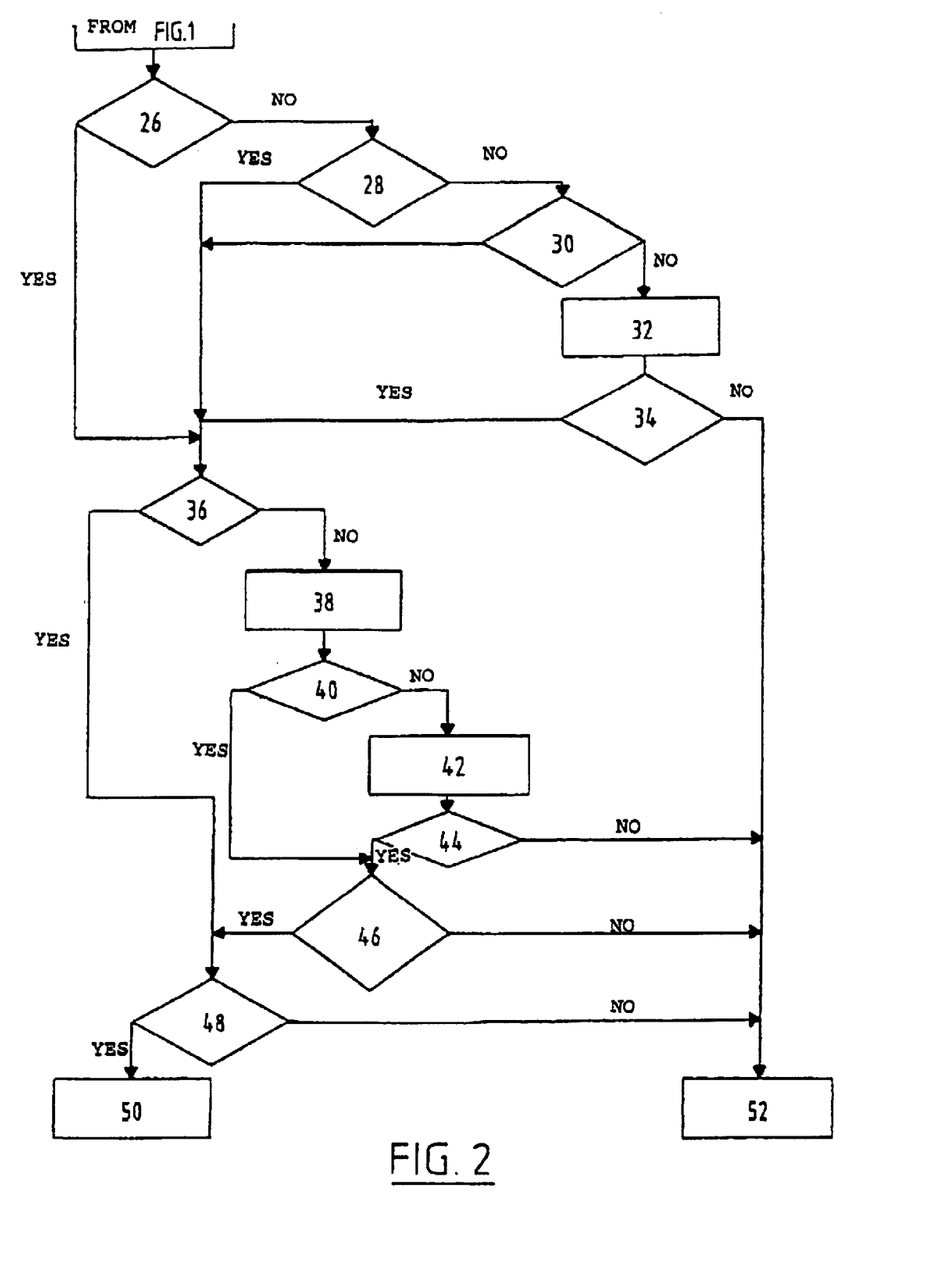
FIG. 2 shows a continuation of the method of the embodiment of FIG. 1.

Sendable messages of FIG. 1 are further processed in FIG. 2. The messages which have been determined sendable messages by the method of FIG. 1 still have to be sent. Since the messages are not addressed to an existing e-mail address, it is necessary to determine to which e-mail address they have to be sent. A first step here is step 26. A check is made in step 26 as to whether the address entered in step 2 resembles a telephone number. If this is so, it is determined in step 36 whether this telephone number is also of a registered user of the system. If it is found in 26 not to be a telephone number, it is determined in step 28 whether the dispatch address resembles a normal postal address. If this is so, it is determined in 36 whether it is a postal address of a registered user. If this is not so, a check is made in step 30 whether the address can be converted to a protocol, number, type of address (such as social security number, ICQ number, Chamber of Commerce registration number, DUNS code and the like). If an identification is thus recognized, a check is made in 36 whether this is associated with a registered user of the system. If it is found in 30 that it is an unrecognizable address, a search assistant (see FIG. 4) is started when the sender inputs the message online. The operation of this search assistant is described in FIG. 4. If it is found in 34 that the addressee has been retrieved, a check is made in 36 whether this belongs to a registered user of the system. If no identification is found in 34, the message is bounced in 52. If it is found in 36 that the addressee is a registered user of the system, a check is then made in 48 whether this user wishes to receive the type of mail which is being sent here. If this is the case, the message is passed on to the addressee in 50.

Figure 5:
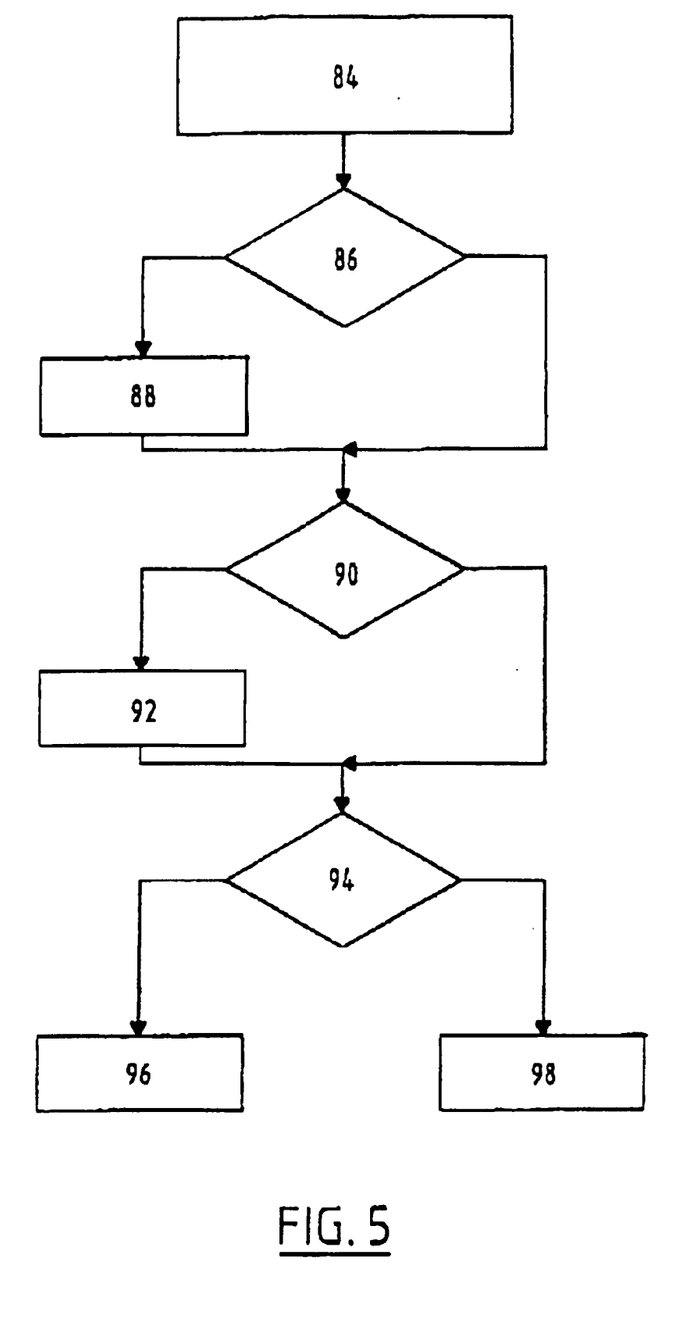
FIG. 5 shows another embodiment of the present invention.

If it is found in 36 that the addressee is not a registered user of the system, the addressee is then rung in 38 and informed that the message is being sent to him making use of this system. It will then be apparent in 40 whether contact is made with the addressee. If this is so, the user can register in 46. The manner in which this takes place is shown in figure 5. If this does not take place, the message is bounced in 52 and, if it does take place, a check is made in 48 whether the profile of the user allows a message to be passed on in 50 in a manner similar to a message which arrived directly in 48 from 36. If in 41 no contact can be made with the addressee, a letter is sent to the addressee in 42 with he information that a message has been sent to him via his system. In 44 the addressee makes contact with the system and registers as user in 46, wherein the message runs through the same steps as took place via 48 and 50 or via 40 and 36. If in 44 the addressee does not make contact with the system, the message will bounce. If the user does not wish to register in 46, the message will also bounce.

Figure 3:
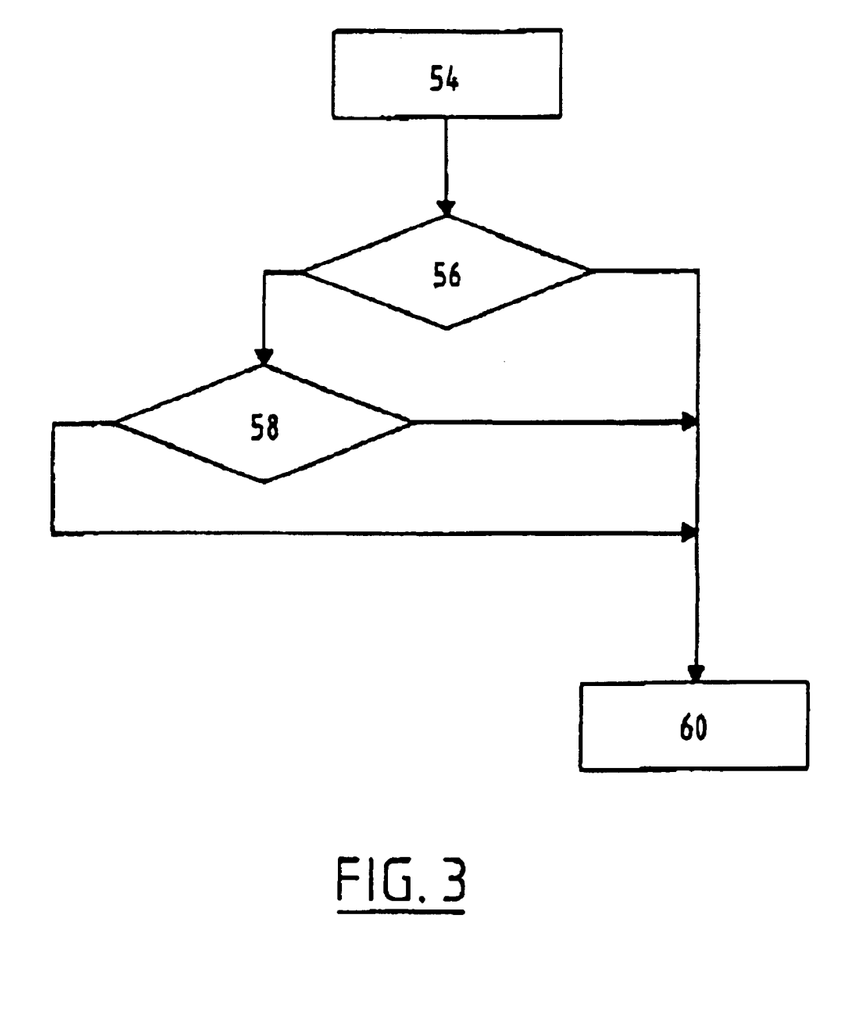
FIG. 3 shows a flow diagram of an embodiment of the present invention.

In step 50 of FIG. 2 the message is passed on to the addressee at his e-mail address, and he receives the advance notice and data concerning the sender. This means that the recipient does not get to read the whole message. The recipient does however get to see possible parameters relating to the period in which the message can be retrieved. In step 56 is determined whether the advance notice is received by the addressee, and if it has not been received a status message goes to the sender in 60, and if the advance notice is received a check is made as to whether the message is also read. The addressee himself determines whether he reads the message on the basis of the advance notice. When the message is read a status message goes to the sender and, if the message is not read within the set time, this is also notified to the sender by means of a status report.

Interesting results can be selectively monitored from the transmission and receipt data. Receipt data can herein be subdivided, such as for instance how often the advance notice and the actual message is read, for how long it is read and/or which part received the most attention.

If problems occur in retrieving the addressee, use can be made of a search assistant (FIG. 4). The search assistant begins in 62 with an opening screen. The system enquires of the sender whether the telephone number of the subscriber is known. If this is known, the system will display a menu with for instance the country, area code and subscriber number. A person can be identified by filling this in. It will then be determined in 76 on the basis of the result whether the correct person has been found. If this is the case, the search assistant is closed in 78 with the message that the e-mail address has been retrieved. If the correct person is not found, an enquiry will be made in 80 as to whether the search must be continued. If this is not so, the search assistant will be closed in 82 with the notification that the message cannot be sent. If it is necessary to search further, the search assistant will go back to the start in 62. If it should be found in 64 that a telephone number is not known, the program continues by enquiring in 68 whether another address is known at which the recipient could be reached. If this is the case, a menu is shown with for instance the country, the place or the street and the house number of the recipient. If it should prove to be the case on the basis hereof that the person can be found in 76, either the search assistant is closed again in 78 or searching is continued in 80. If it is found in 68 that no address of the recipient is known, an enquiry is made in 72 as to whether the name is known. If the name is known, a menu is shown with names, initials and other known data in 74. It is then determined once again in 76 whether the person has been found and, if so, the search assistant is closed in 78 and, if not, a request is made as to whether the search can continue in 80. Notification can then optionally be made that there are no further search options and searching is ended in 82 with the notification that the message cannot be sent. If it is found in 72 that the name of the recipient is not known, searching is also ended in 82 with the notification that the message cannot be sent. Using the search assistant of FIG. 4 it is of course also possible to search in other sequences than per se via telephone number, address or name.

In FIG. 5 are shown steps with which a new user can sign up for the system and can enter diverse data on the basis of which he can be found. In 84 the user registers a name and a password. He also makes a link with one or more directories with data already known about him. This may be a public telephone directory or the like. The user can also input additional data, select what types of information he does or does not wish to receive via this system, and so on. In step 86 a user can exclude persons from whom he does not wish to receive messages via this system; if he desires this, he can build up a list in 88 of persons or groups of senders to be excluded, using a search menu. A user can also make a directory of friends/contacts in 90. If he wishes, he can make a list of friends/contacts in 92, optionally using a search menu. This search menu can for instance be the search assistant of FIG. 4. Finally, the system which performs the method can enquire in 94 whether the user wishes to use the system privately or commercially. If it is a private user, this registration will take place in 96. If the user wishes to make commercial use of the system, this take places in 98.

Figure 6:
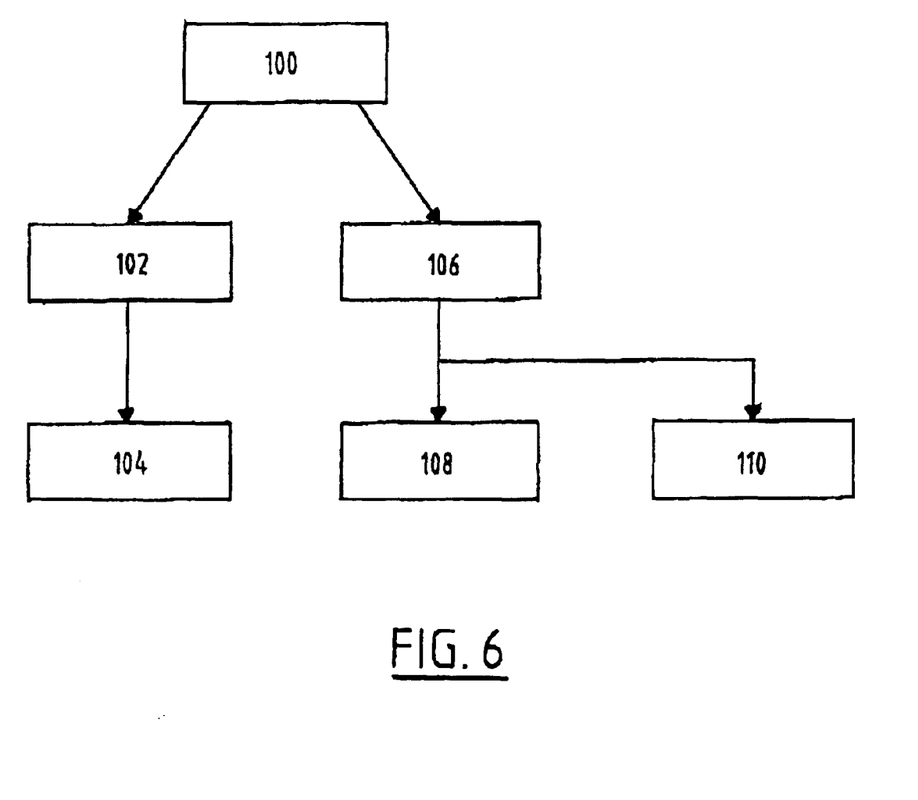
FIG. 6 shows a further embodiment of the present invention.

FIG. 6 shows how, using the further message data such as advance notice data and/or subject data, content data, parameter data such as for instance period of validity data and/or areas of interest data, messages can be allotted to channels. In 100 a message is sent via a channel chosen on the basis of this data. This is useful because a wide diversity of types of message is possible on the basis of this data. By means of step 48 in FIG. 2 it is possible, on the basis of profiles of recipients, to allow recipients to determine what types of e-mail messages are accepted. These channels enable senders to determine via which channels messages are sent, A distinction is made here between general channels 102, which apply for all recipients who make use of this system, and more specific channels 106 which are suitable for more specific groups of recipients. Examples of channels include private mail, advertising, legal mail, central government mail, local government mail, nationwide advertising, local advertising, neighbourhood (residents), areas of interest etc. These channels can be subdivided into underlying subjects, such as for instance public information, election information, statutory orders and so on.

A mailing, i.e. a large number of substantially the same messages sent to many recipients, is sent within a channel. In 104 the message arrives at the recipient in the relevant general channel. Messages sent to a specific channel arrive at the user in 108 if the recipient has this relevant channel available. If the message is directed to a recipient who does not have this specific channel available, the message arrives in a non-defined channel in 110.

The message is also stored such that by means of the stated search functionality of the web site it can be emphasized for all recipients of the web site if the sender indicates this.

A further channel, billings, can make use of the said encoding/authentication functionality. Bills are then received in this channel which can be paid by return of mail using this functionality. Authenticated senders can also direct their bills to the recipients via this channel.

LIST OF FIGURE NUMERALS

2. Input of advance notice Input of message Input recipient (optionally using search assistant, FIG. 4) Input (period of validity) parameters
4. A recipient
6. Authorization
8. Spam delay
10. Check for viruses
12. Virus found
14. Clear out virus
16. Virus removed
18. Delete message
20. Notification to sender that message was unsendable due to virus
22. Notification to sender that message contains virus
24. Send message (see FIG. 2)
26. Resembles telephone
28. Resembles address
30. Resembles other protocol
32. Start search assistant (FIG. 4)
34. Pound
36. Register user
38. Ring addressee with notification that a message is being sent to him
40. Contact Letter to addressee with notification that a message is being sent to him 44. Contact
46. Registers user (FIG. 5)
48. Profile allows message
50. Pass message on (FIG. 3)
52. Bounce
54. Sent message (from FIG. 2)
56. Advance notice received
58. Message read
60. Status message to sender
62. Start search-assistant (of FIG. 1 or 2)
64. Telephone number known
66. Menu with: country, area code, subscriber number
68. Address known
70. Menu with: country, place, street/house
72. Name known
74. Menu with: names, initials, other known data
76. Found
78. Address retrieved, close search-assistant
80. Continue search
82. Recipient unidentifiable
84. User registers user name/password, makes link to public telephone directory, inputs additional data, selects channels, uses search-assistant 86. Exclude persons
88. Build up list of persons/groups of senders to be excluded, uses search-assistant
90. Make friends/contacts
92. Make list with friends/contacts, use search-assistant
94. Checks private or commercial
96. Registration private user completed
98. Registration commercial user completed
100. Send message
102. General channels
104. Receiving by recipient via general channel
106. Specific channels
108. Receiving by recipient via specific channel
110. Receiving by recipient via not-defined channel

What is claimed is:

1. A method for addressing at least one of a person of and an organisation via electronic means and for sending in an electronic manner at least one e-mail message addressed accordingly, the method comprising the steps of:

storing addresses of the people and organisations in a database;

linking the addresses from the database to publicly accessible data held by an organisation;

automatically retrieving an email address in addressing data in the database; and sending at least a part of the message to the e-mail address retrieved by searching the publicly accessible data.

2. A method for processing and/or sending in electronic manner one or more e-mail messages which are addressed according to the method of claim 1 to one or more recipients.

3. The method as claimed in claim 2, further comprising one or more steps for inputting message data comprising at least one or more items of the publicly accessible data.

4. The method as claimed in claim 3, comprising one or more steps for inputting further message data such as advance notice data and/or subject data, content data, parameter data such as for instance period of validity data and/or areas of interest data.

5. The method as claimed in claim 2, further comprising one or more steps for filtering the e-mail messages.

6. The method as claimed in claim 5, wherein the filtering step comprises one or more steps for checking for presence of viruses in the e-mail messages and optional removal thereof from the e-mail messages.

7. The method as claimed in claim 5, further comprising steps for checking on transmission permission of a sender.

8. The method as claimed in claim 5, further comprising one or more steps for preventing and/or delaying spam messages.

9. The method as claimed in claim 3, further comprising steps for:

automatically retrieving an e-mail address in the addressing data; and sending at least a part of the message to the e-mail address if this is permissible on the basis of results from the filtering steps.

10. The method as claimed in claim 2, further comprising steps for sending status messages relating to the message to a sender.

11. The method as claimed in claim 2, further comprising steps for assisting in a manual search for an addressee in the database.

12. The method as claimed in claim 8, further comprising steps for retrieving an addressee on the basis of one or more of a telephone number, a postal address or a name.

13. The method as claimed in claim 9, further comprising steps for:

automatically retrieving an e-mail address by searching according to telephone number;

automatically retrieving an e-mail address by searching according to address; and automatically retrieving an e-mail address by searching according to another protocol, such as a social security number, DUNS, chamber of commerce number or VAT number.

14. The method as claimed in claim 1, further provided with a step for registering users by means of user profiles so that the users can be addressed using the method.

15. The method as claimed in claim 14, further comprising a step for adding an exclusion list to the user profile whereby the user can determine from whom no messages may be passed therefrom.

16. The method as claimed in claim 14, comprising a step for adding one or more of a list of friends/contacts or a commercial/private indication to the user profile.

17. The method as claimed in claim 1, further comprising a step for writing to an addressee that is not a registered user of the method.

18. The method as claimed in claim 1, which is provided with steps for ringing an addressee that is not a registered user of the method.

19. The method as claimed in claim 1, wherein a web page of a person or organisation is addressed electronically.

20. The method as claimed in claim 1, wherein messages are addressed with e-mail address of a recipient in a manner not visible to a sender.

21. The method as claimed in claim 1, wherein name and/or telephone number form part of a address.

22. The method as claimed in claim 1, wherein the database forms part of an internet site.

23. The method as claimed in claim 1, further comprising steps for searching for messages on the basis of advance notice data and/or subject data, content data, parameter data such as for instance period of validity data and/or areas of interest data.

24. The method as claimed in claim 1, further comprising steps for deleting messages which have for instance been superseded by a new version or of which the period of validity has elapsed.

25. The method as claimed in claim 1, wherein steps are further provided for securing and/or encoding the message traffic.

26. The method as claimed in claim 1, wherein steps are provided for performing matters with high security requirements, such as identification/authentication, for instance for the purpose of financial transactions such as payments, on the basis of the security and/or encoding.

27. The method as claimed in claim 1, wherein the publicly accessible data is at least one of a social security number, a D&B DUNS number, a chamber of commerce number and a VAT number.

* * * * *

UNITED STATES PATENT AND TRADEMARK OFFICE
CERTIFICATE OF CORRECTION

PATENT NO.    : 6,944,628 B1
DATED         : September 13, 2005
INVENTOR(S)   : Anthony Jacques Louis De Breed

It is certified that error appears in the above-identified patent and that said Letters Patent is hereby corrected as shown below:

Column 9,
Line 16, "of a person of and" should read -- of a person and --.

Column 10,
Line 51, "encoding the message" should read -- encoding message --.

Signed and Sealed this

Twenty-first Day of February, 2006

JON W. DUDAS
*Director of the United States Patent and Trademark Office*